Inventor
LOWELL E. NORTON
By J. L. Whittaker
Attorney

STABILIZATION OF MICROWAVE OSCILLATORS

Filed June 25, 1948 2 SHEETS--SHEET 2

Inventor
LOWELL E. NORTON
By J. L. Whittaker
Attorney

Patented Feb. 5, 1952 2,584,608

UNITED STATES PATENT OFFICE 2,584,608

STABILIZATION OF MICROWAVE OSCILLATORS

Lowell E. Norton, Princeton Junction, N. J., assignor to Radio Corporation of America, a corporation of Delaware Application June 25, 1948, Serial No. 35,185

17 Claims. (Cl. 250—36)

This invention relates to methods and systems for stabilizing the frequency of a microwave oscillator by utilization of the sharp molecular resonance exhibited by certain gases at microwave frequencies.

The microwave absorption spectra of certain gases including ammonia, carbonyl sulphide and methyl halides comprise lines of distinctive frequency distribution for the different gases. At very low pressures these "lines" or absorption regions may break up into a plurality of sharply defined lines, each corresponding with a precise microwave frequency unaffected by ambient temperature, pressure and other commonly encountered variables.

In accordance with the present invention, the carrier frequency of a microwave oscillator is modulated additionally to produce side-band frequencies, at least one of these frequencies being close to the frequency of molecular resonance of gas confined under low pressure. The phase-difference between the modulating frequency and a demodulation component of the output of the gas cell is amplified to produce an "error" voltage which varies in sense and magnitude in accordance with the deviation of the microwave oscillator frequency and which is applied to the oscillator to minimize its frequency deviation.

More specifically, in some forms of the invention which are especially suited for control of higher power oscillators, the frequencies of the microwave oscillator and of a low-frequency modulating oscillator are mixed by a balanced modulator, or equivalent, for suppression of the carrier frequency so to avoid injury to the rectifiers used for modulation and to avoid saturation effects in the gas cell; in other forms of the invention, satisfactory for lower powers, the carrier frequency as well as the side-band frequencies are transmitted through the gas cell for subsequent demodulation.

The invention further resides in methods and systems having novel features hereinafter described and claimed.

For a more detailed understanding of the invention and for illustration of systems utilizing it, reference is made to the accompanying drawings in which.

Figure 1:
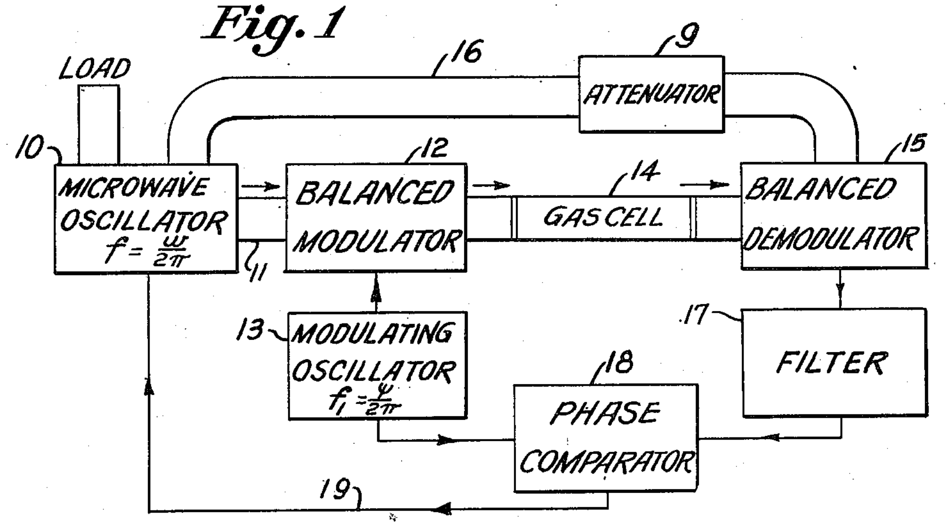
Figure 1 is a block diagram of a stabilized oscillator system in which the carrier is suppressed.
Figures 2, 3, 7:
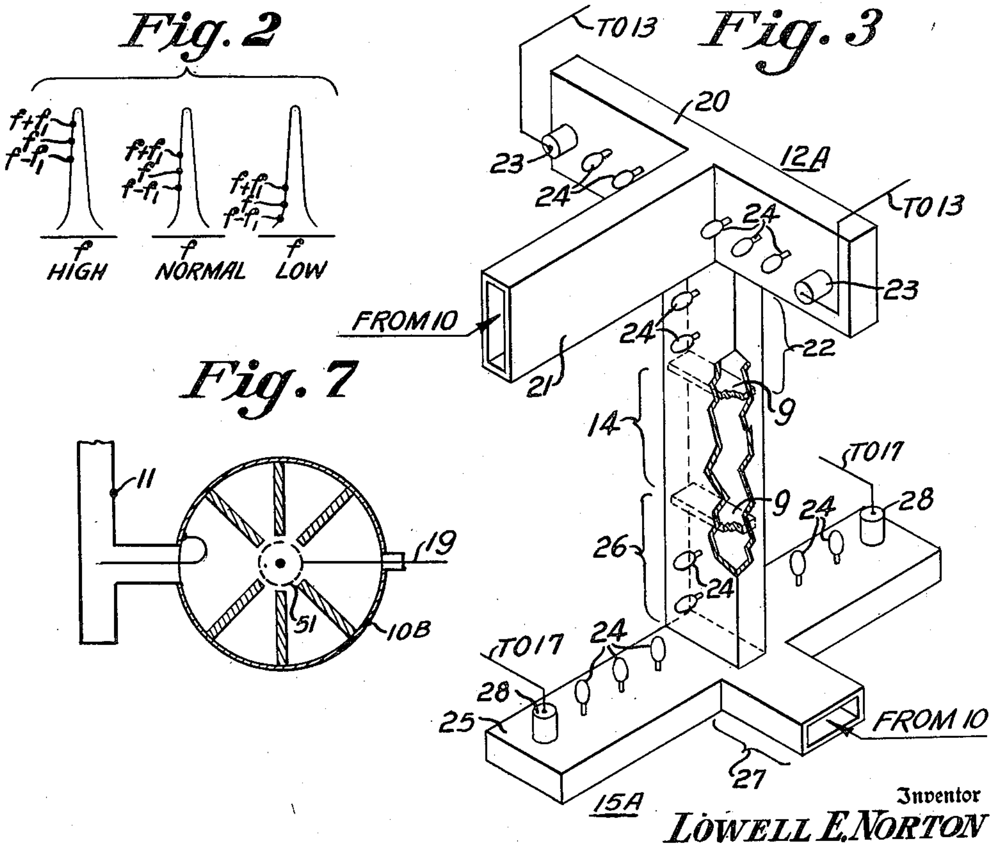
Figure 2 is an explanatory figure referred to in discussion of the operation of the system of Figure 1.
Figure 4:
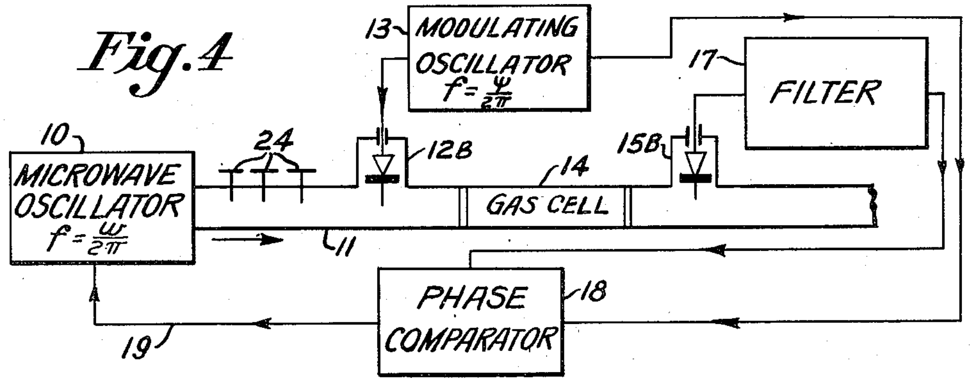
Figure 5:
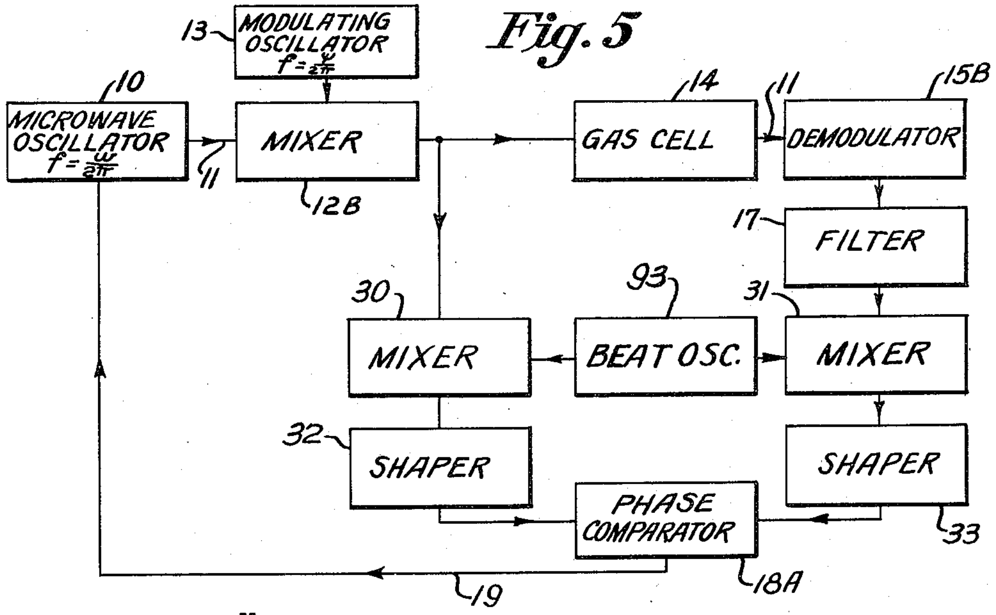
Figure 6:
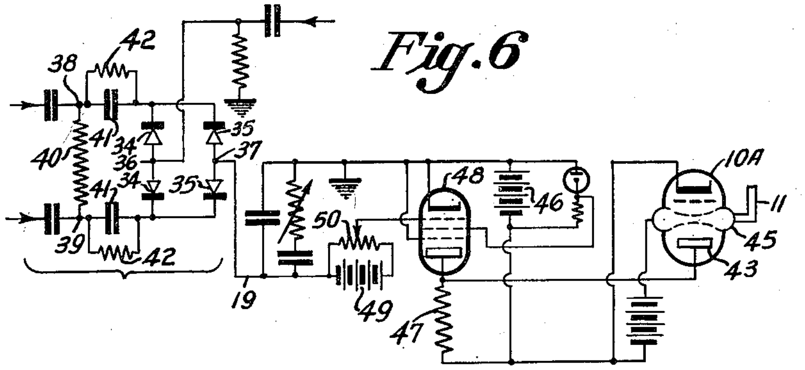

Figure 3 in perspective illustrates a balanced modulator assembly suited for use in the system of Figure 1;

Figure 4 is a block diagram of a stabilized oscillator system in which the carrier and side-band frequencies are impressed upon the gas cell;

Figure 5 illustrates a modification of the system of Figure 4;

Figure 6 is a schematic diagram of a phase-comparator circuit utilizable in the systems of Figures 1, 4 and 5 for stabilization of a klystron; and Figure 7 diagrammatically illustrates a magnetron having a frequency-control electrode.

As more fully discussed in my copending applications Serial Numbers 29,836, now abandoned (application Serial No. 236,945 filed July 16, 1951, is a continuation thereof), 8,246 and 5,603, now Patent No. 2,559,730 issued July 10, 1951, many gases under reduced pressure exhibit a fine line absorption effect at microwave frequencies; in the case of ammonia, for example, many sharp resonances occur within a comparatively narrow frequency range in the neighborhood of a frequency corresponding with 1.25 centimeters wavelength.

In the system of Figure 1, the microwave oscillator 10 is to be stabilized at a frequency ($f=\omega/2\pi$) corresponding with a selected one of the gas absorption frequencies of a gas, for example, ammonia. The oscillator is connected to a load line and a stabilizing channel by suitable transmission lines, usually wave guides, although coaxial lines may be used. The stabilizing channel 11 includes, in the system shown in Figure 1, a balanced modulator 12 upon which is impressed the frequency ($f_1=\psi/2\pi$) of a modulating oscillator 13. As the modulator 12 is balanced, its output does not include the carrier frequency of the oscillator 10 but includes at least two side-band frequencies $$\left(f_2=\frac{\omega+\psi}{2\pi}\right) \text{ and } \left(f_3=\frac{\omega-\psi}{2\pi}\right)$$

Expressing the frequency and phase of the field produced by the oscillator as ($e=E \sin \omega t$) and the frequency and phase of the modulating potentials as ($e_1=\pm E_1 \sin \psi t$), the frequency and phase of the fields propagated by the balanced modulator may be represented by $$(1) \quad e_3=E_3\left\{\frac{m}{2} \cos \left[(\omega-\psi)t\right]-\frac{m}{2} \cos \left[(\omega+\psi)t\right]\right\}$$

where $m$=modulation factor.

The microwave fields represented by Equation 1 are impressed upon the gas cell 14 which may comprise a section of wave guide having gas-tight windows at its opposite ends and containing ammonia under reduced pressure to exhibit sharp resonance. At least one of the side-band frequencies $f_1$ or $f_2$ is chosen to fall within the frequency interval of a selected one of the narrow gas absorption lines of cell 14; if the modulating frequency is chosen low enough, both side-band frequencies will fall within the frequency interval of the chosen gas line. In general, the modulating frequency is low compared to the frequency of oscillator 10 and may, for example, be of the order of 0.15 megacycle or less, although for some applications the modulation frequency might be higher. Similar side-bands may also be produced by frequency modulating the microwave oscillator directly but this method is not preferred because the stabilized oscillator output will always contain these side-bands unless they fall out of the pass frequency band for a particular application.

The resonance effects produced by some of the gas lines are extremely sharp, corresponding with that of a circuit having a Q of about 70,000 and by selection of one of such lines, it can be insured that the gas cell 14 shall have an extremely sensitive phase-frequency characteristic. Consequently if one or both of the side-band frequencies are on the gas line, the two side-bands will undergo substantially different amounts of phase shift in their transmission through the gas cell.

The fields out of the gas cell are at frequencies and phases expressed by (2)

$$e_4=E_4\left\{\frac{m}{2}\cos[(\omega-\psi)t+\alpha_1]-\frac{m}{2}\cos[(\omega+\psi)t+\alpha_2]\right\}$$

where $\alpha_1$=phase shift angle of lower side-band, due to the gas.

$\alpha_2$=phase shift angle of upper side-band, due to the gas.

The output of the gas cell is impressed upon a balanced demodulator 15, or equivalent, upon which is also impressed the carrier frequency of the oscillator 10. The level of the reintroduced carrier as supplied through line 16 is preferably so low, because of inclusion in the line of attenuator 9, that the carrier amplitude is only somewhat larger than the side-band amplitudes. This has the effect of enhancing the moduation factor in the fields applied to the rectifiers of the balanced modulator 15 which fields can be expressed as:

(3)

$$e_5=E_5\left\{\sin\omega t+\frac{m_1}{2}\cos[(\omega-\psi)t+\alpha_1]-\frac{m_1}{2}\cos[(\omega+\psi)t+\alpha_2]\right\}$$

where $m_1$= enhanced moduation factor.

Assuming the rectifiers are identical crystals having a square law response their output may be represented by Equation 4 below. If the crystals are not square law, the output of the modulator will include additional higher order terms which serve no useful purpose.

(4)

$$e_6=E_6m_1\{\sin[(2\omega+\psi)t+\alpha_2]-\sin[(2\omega-\psi)t+\alpha_1]-\sin(\psi t+\alpha_2)-\sin(\psi t-\alpha_1)\}$$

where the circuit adjustment is such that $\alpha_2\neq\alpha_1$. By suitable filtering and by-passing effected by filter 17, the output potentials represented by all terms of Equation 4 except the selected one, specifically the last, are rejected or attenuated so that the output of the filter may be expressed as:

(5)

$$e_7=E_7[\sin(\psi t+\alpha_2)+\sin(\psi t-\alpha_1)]=E_7\sqrt{2(1-\sin\alpha_1\sin\alpha_2+\cos\alpha_1\cos\alpha_2)}\sin\left(\psi t+\frac{\alpha_2-\alpha_1}{2}\right)$$

The output of the filter is therefore of the same frequency as the modulating oscillator 13 but is displaced in phase with respect thereto to extent dependent upon the phase shift of the side-band energy in its transmission through the gas cell 14. Upon tendency of the carrier frequency of the oscillator 10 to deviate from this desired value, the side-band frequencies shift their position with respect to the selected gas line to cell 14 and therefore experience a correspondingly different amount of phase shift.

This variable phase $$\frac{\alpha_2-\alpha_1}{2}$$

is compared with the constant or reference phase potential at frequency $\psi/2\pi$ from the modulating oscillator 13. Any suitable phase comparison circuit generically represented by phase-comparator 18 may be used; a typical one is shown in Figure 6 and later described. The phase-comparator produces a direct-current "error" voltage which may be applied in any of the conventional manners to control the frequency of oscillator 10. Assuming the oscillator tube 10 is a reflex klystron, for example, the "error" voltage may be used to control the reflector-anode potential. The sense and magnitude of the "error" voltage depends upon the direction and extent of the frequency drift and as applied to the oscillator 10 is effective to correct for, or minimize, deviations in either sense from the desired frequency.

On exaggerated frequency scale and assuming a low modulating frequency, Figure 2 illustrates the shift in position of the carrier and side-band frequencies as the carrier frequency of oscillator 10 tends to rise above or fall below normal frequency. With increasing frequency, the "error" voltage supplied by line 19 from the phase-comparator 18 to the oscillator 10 is in sense effective to lower the frequency, whereas when the frequency is falling from the desired value, the sense of the "error" voltage applied tends to increase the oscillator frequency.

In the system of Figure 1, there may be frequency-amplitude and frequency-phase effects due to the frequency characteristics of the transmission system and components other than the gas cell. However, the Q of the gas absorption line is very high, of the order of 70,000, whereas the equivalent Q of the other circuit components will always be of much lower order of magnitude so that the undesired frequency-amplitude and frequency-phase effects are minor and can be compensated for by circuit adjustments.

In Figure 1 or the other systems herein shown, the side-band frequencies may be produced by frequency-modulation of oscillator 10 instead of amplitude-modulation, but in general this is less desirable.

A construction suitable for performing the functions of the balanced modulators 12 and 15 of Figure 1 and which also includes the gas cell 14 is shown in Figure 3. In effect, the unit comprises two "Magic Tees" connected respectively to lines 11 and 16 from oscillator 10 and interconnected by that section of transmission line 11 which includes the gas cell 14. The upper "Magic Tee" 12A suited to serve as balanced modulator 12 of Figure 1 comprises wave guide section 20, from the wide and narrow faces of which extend the wave guide legs 21 and 22 at equal distances from the ends of section 20. The leg 21 reflects energy from the microwave oscillator 10, the resulting microwave fields being in phase at the crystal rectifiers 23, 23 or equivalent. The application of the modulating frequency to each of the rectifiers 23 produces side-band terms, Equation 1, which are propagated back toward the junction of leg 21 with wave guide section 20 in addition to some propagation at the oscillator frequency if there be reflection at the crystals. Since the fields propagated in the section 20 toward the junction with leg 22 excite the latter only by virtue of fringing fields, these two fields excite leg 22 in opposite phase. Therefore, the two side-band fields are additive in excitation of leg 22 whereas the reflected carrier terms mutually cancel; consequently only the side-band terms are propagated in leg 22 to the gas cell 14.

It is of course obvious from the symmetry of the construction that leg 21 could be connected to the gas cell and leg 22 connected to oscillator and similar results obtained.

The balanced demodulator 15A for serving the purpose of demodulator 15 of Figure 1 is of similar construction. The side-band fields as shifted in phase through their passage to cell 14 are fed into leg 26 of the lower "Magic T" to product fields which are in phase at the rectifier crystals 28, or equivalent, symmetrically disposed in wave guide section 25 on opposite sides of leg 26. The carrier frequency energy introduced by leg 27 produces fields in phase as applied to the crystals.

Output to the phase comparator 18 could be taken from only one of the crystals 28, but since it is easier to maintain the bridge symmetry and balance by using both crystals, it is better practice to combine the output from the two crystals 28 in phase addition for the selected demodulation component of the side-band frequencies. Since in the "Magic T" bridge, there is a phase reversal in the E plane junction it is necessary to either reverse the output of one crystal with respect to the other or to reverse the insertion of one crystal to obtain the desired phase addition of their outputs.

The plungers 24 shown in Figure 3 coact with the legs of the "Magic Tees" to serve as impedance-matching transformers.

For a microwave oscillator of low or medium power output, the simpler stabilizing system shown in Figure 4 is satisfactory. In this modification, the outputs of the microwave oscillator 10 and the modulating oscillator 13 are mixed by an unbalanced modulator 12B, such as a single rectifier crystal, or equivalent, so that the microwave energy impressed upon the gas cell 14 includes the carrier frequency as well as the side-band frequencies, at least one of which falls within the frequency interval of the selected gas line. If the modulating frequency is chosen low enough, all three frequencies fall within that interval. Of course, higher order modulation products than the side-band frequency plus and minus the modulating frequency will be generated, but no use need be made of them. The fields entering the gas cell correspond with Equation 1 plus a term corresponding with the carrier frequency and the fields out of the gas cell correspond with Equation 2 plus a term E sin $(\omega t+\alpha_3)$.

Assuming the characteristic of the rectifier of modulator 15B is square law, the crystal output may be expressed by Equation 6 below. If the crystal does not have a square law response additional higher order terms appear but they are not utilized.

(6)

$$e_8=E_8\Big[\frac{1}{2}\{1+\cos[2(\omega t+\alpha_3)]\}+\frac{m_1}{2}\sin[(2\omega-\psi)t+\alpha_3+\alpha_1]-\frac{m_1}{2}\sin[(2\omega+\psi)t+\alpha_3+\alpha_2]+\frac{m_1^2}{8}\{1+\cos[(\omega-\psi)t+\alpha_1]\}-\frac{m_1^2}{4}\cos(-2\psi t+\alpha_1-\alpha_2)-\frac{m_1^2}{4}\cos(2\omega t+\alpha_1+\alpha_2)+\frac{m_1^2}{8}\{1+\cos 2[(\omega+\psi)t+\alpha_2]\}+\frac{m_1}{2}\{\sin(\psi t+\alpha_3-\alpha_1)+\sin(\psi t-\alpha_3+\alpha_2)\}\Big]$$

By suitable filtering and by-passing effected by filter 17, all of the terms of Equation 6 except the chosen one, specifically the last one, are rejected or suppressed so that the output of the filter may be expressed as (7)

$$e_9=E_9m_1\{\sin(\psi t+\alpha_3-\alpha_1)+\sin(\psi t-\alpha_3+\alpha_2)\}=E_9m_1\sqrt{2[1+\cos(\alpha_3-\alpha_1)\cos(\alpha_3-\alpha_2)-\sin(\alpha_3-\alpha_1)\sin(\alpha_3-\alpha_2)]}\sin\left(\psi t+\frac{\alpha_2-\alpha_1}{2}\right)$$

The variable phase of the chosen demodulation product is compared in the phase-comparator 18 with the constant phase reference supplied by the modulating oscillator 13 to produce a direct-current "error" voltage applied by the output line 19 of the phase-comparator to the microwave oscillator for stabilization of the frequency thereof.

As in the system of Figure 1 the "error" voltage has sense, its sign or polarity depending upon the direction of any shift of the carrier frequency of oscillator 10. Also, as in the system of Figure 1, there may be extraneous frequency-amplitude or frequency-phase effects due to the frequency characteristics of components of the systems other than gas cell 14, but as the Q of the gas absorption line is of the order of 70,000, the undesired effects of the circuit components are of minor order and can be rejected or compensated by circuit adjustment.

When because of choice of the modulating frequency or because of selection of the carrier frequency for phase comparison purposes, the phase-difference comparison is between frequencies of high magnitude, the phase-comparator may be similar to that shown in copending application Serial Number 678,554 filed June 22, 1946. Preferably, however, the inputs to the phase-comparator are the low-difference frequencies resulting from beating the output of a high-frequency oscillator 93 against the carrier frequency of the microwave oscillator and against the selected component of the output of demodulator 15B. Specifically, the constant phase reference is produced by combining in mixer 30 the frequency of oscillator 10 (ahead of cell 14) with the frequency of oscillator 93 to produce a difference-frequency applied to phase-comparator 18A: the variable phase is produced by combining in mixer 31 the frequency of oscillator 93 and the carrier demodulation component of the output of cell 14 to produce the same difference-frequency.

As exemplary of a phase-comparator suited for use in the system of Figure 5, reference is made to Figure 6. The crystals 34, 34 and 35, 35, or equivalent, form a rectifier bridge having direct-current output terminals 36 and 37. The common terminals of one pair of rectifiers 34, 35 are connected to input terminal 38 of the phase-comparator 18A through a resistor-condenser network 41, 42 and the common terminal of the other pair of rectifiers is similarly connected to input terminal 39. The terminals 38, 39 are shunted by a resistor 40 and are respectively connected by blocking condensers to a pulse-shaping circuit (Figure 5), preferably of the type disclosed in my copending application Serial No. 29,836, which converts the output voltage of mixer 30 (or 31) into two trains of sharply peaked pulses concurrent in time and opposite in polarity. The output voltage of the other mixer 31 (or 30) is preferably converted to a sawtooth wave by shaping circuits 32 such as disclosed in my aforesaid copending application and applied to input terminal 36 of the phase-comparator.

For control of the frequency of a reflex klystron, the "error" voltage produced by the phase-comparator may be utilized to control the potential of the reflector anode as shown in Figure 6. Briefly, the potential of the reflector anode 43 of klystron 10A depends upon the IR drop across a resistor 47 in circuit between the stabilized direct-current source 46 and the anode of a control tube 48. The control-grid bias of tube 48 comprises a steady component, supplied by battery 49 or equivalent and potentiometer 50, and a variable component supplied from the phase-comparator 18A by the control line 19. Upon deviation of the carrier frequency of oscillator 10A, in one sense or another, the polarity of the "error" voltage correspondingly changes to vary the bias of the regulator tube 48 in sense to restore the generated frequency toward or to its desired value. When the microwave oscillator is a magnetron 10B, Figure 7, having a frequency-control grid 51, the "error" voltage developed by the phase-comparator may be applied to the grid in correction for any tendency of the generated frequency to drift from the desired value.

It shall be understood the invention is not limited to the specific systems disclosed and that changes and modifications may be made within the scope of the appended claims.

I claim as my invention:

1. The method of stabilizing the frequency of a microwave oscillator which comprises modulating the oscillator to produce side-bands, impressing at least one of the side-bands upon a body of gas exhibiting sharp molecular resonance at a frequency close to said one of the side-band frequencies to produce a phase-shift varying with the oscillator frequency, demodulating the microwave energy transmitted by the gas, and controlling the oscillator frequency to minimize variation of the phase-difference of the modulating frequency as applied to said microwave oscillator and as derived by demodulation of microwave energy transmitted by said gas cell.

2. The method of stabilizing the frequency of a microwave oscillator which comprises modulating the carrier frequency of the oscillator additionally to produce modulation signal components including side-band frequencies, impressing the modulated output of said oscillator upon a body of gas exhibiting sharp molecular resonance at a frequency close to at least one of aforesaid frequencies, deriving demodulation components of the energy transmitted through said gas, producing a control voltage varying in accordance with variations of the phase-difference between the modulating frequency and a demodulation component of the microwave energy transmitted through said gas, and applying said control voltage to said oscillator to minimize variation of said phase-difference.

3. The method of stabilizing the frequency of a microwave oscillator which comprises modulating the carrier frequency of the oscillator to produce side-band frequencies, impressing only the side-band frequencies upon a body of gas exhibiting sharp molecular resonance at a frequency close to at least one of them, demodulating the microwave energy transmitted by said gas, producing a control voltage varying in accordance with the phase-difference between the modulating frequency as applied to said carrier frequency and as produced by demodulation of the microwave energy transmitted through said gas, and applying said control voltage to said oscillator to minimize variation of said phase-difference.

4. The method of stabilizing the frequency of a microwave oscillator which comprises modulating the carrier frequency of the oscillator additionally to produce side-band frequencies, impressing the modulation output of said oscillator upon a body of gas exhibiting sharp molecular resonance at a frequency close to at least one of aforesaid frequencies, demodulating the microwave energy transmitted through said gas, beating the modulated output of the oscillator and a demodulation component of the energy transmitted through said gas each against the high-frequency output of another oscillator to produce two identical low frequencies whose phase difference varies with deviation of said carrier frequency, producing a control voltage varying in accordance with variations of said phase-difference, and applying said control voltage to said microwave oscillator to stabilize its carrier frequency.

5. The method of stabilizing the frequency of a microwave oscillator which comprises amplitude-modulating the output of said oscillator to produce modulation signal components including side-band frequencies, impressing modulated output energy of said oscillator upon a body of gas exhibiting sharp molecular resonance at a frequency close to at least one of said side-band frequencies, deriving demodulation components of the energy transmitted through said gas, producing a control voltage varying in accordance with variations of the phase-difference between the modulating frequency as applied to the microwave oscillator and a demodulation component of a side-band as transmitted through said gas, and effectively applying said control voltage to said oscillator to minimize variation of said phase-difference.

6. The method of stabilizing the frequency of a microwave oscillator which comprises mixing its output with that of a low-frequency oscillator to produce modulaton signal components including side-band frequencies, impressing said side-band frequencies upon a body of gas exhibiting sharp molecular resonance at a frequency close to at least one of said side-band frequencies, deriving demodulation components of the energy transmitted through said gas, producing a control voltage varying in accordance with variations of the phase-difference between the frequency of low-frequency oscillator and a demodulation component of a side-band transmitted through said gas, and effectively applying said control voltage to said microwave oscillator to minimize variation of said phase-difference.

7. The method of stabilizing the frequency of a microwave oscillator which comprises amplitude-modulating the output of said oscillator to produce side-band frequencies, impressing the modulated output upon a body of gas exhibiting sharp molecular resonance at a frequency close to at least one of said side-band frequencies, demodulating the side-band output transmitted by the gas, determining the difference in phase between the modulating frequency and a demodulation component having the same frequency, and applying to said microwave oscillator a frequency-control effect of magnitude and sense varying in accordance with aforesaid phase-difference.

8. The method of stabilizing the frequency of a microwave oscillator which comprises amplitude-modulating the carrier of said oscillator to produce side-bands, suppressing the carrier, impressing at least one of the side-bands upon a body of gas exhibiting sharp molecular resonance at a frequency close to the frequency of said one of the side-bands, demodulating the side-band transmitted through said gas, and applying to the microwave oscillator a frequency-control effect of sense and magnitude varying with variation of the phase relation between the modulating frequency as applied to the carrier and as appearing as a demodulation product transmitted by said gas.

9. The method of determining deviations of the frequency of a microwave oscillator which comprises amplitude-modulating the carrier frequency of said oscillator to produce side-band frequencies, impressing the carrier and at least one of said side-bands upon a body of gas exhibiting sharp molecular resonance at a frequency close to the frequency of one of said side-bands, demodulating the microwave energy transmitted by the gas, selecting a demodulation component having the same frequency as the modulating frequency, and detecting the phase-difference between the modulating frequency and said selected demodulation component of the same frequency.

10. A system for stabilizing the frequency of a microwave oscillator comprising a modulating oscillator for said microwave oscillator, a cell containing gas exhibiting sharp molecular resonance at a frequency close to at least one of the frequencies of the modulated output of said microwave oscillator, a demodulator for demodulating the modulated microwave energy transmitted by said gas cell, and means for controlling the frequency of said oscillator comprising a phase-comparator producing a control voltage varying in accordance with the phase-difference of its inputs from said modulating oscillator and said demodulator.

11. A system for stabilizing the frequency of a microwave oscillator comprising a modulating oscillator for said microwave oscillator, a cell containing gas exhibiting sharp molecular resonance at a frequency close to a side-band frequency of the modulated output of said microwave oscillator, a demodulator for demodulating the microwave energy transmitted by the gas to derive a voltage whose phase angle varies with the frequency of the microwave oscillator, and means for controlling the frequency of said oscillator comprising a phase-comparator producing a control voltage varying in accordance with the difference between the varying phase of said derived voltage and a reference phase produced by the modulating oscillator.

12. A system for stabilizing the frequency of a microwave oscillator comprising a modulating oscillator, a balanced modulator upon which the outputs of said oscillators are impressed to produce side-band frequencies, a cell upon which said side-band frequencies are impressed and containing gas exhibiting sharp molecular resonance close to one of said side-band frequencies, a balanced demodulator upon which are impressed the outputs of said microwave oscillator and of said gas cell, and means for controlling the frequency of said microwave oscillator producing a control voltage varying in accordance with the difference between the reference phase of the modulating oscillator and the varying phase of an output component of said balanced demodulator having the same frequency.

13. A system for stabilizing the frequency of a microwave oscillator comprising a modulating oscillator, a mixer upon which the outputs of said oscillators are impressed, a cell upon which the output of said mixer is impressed and which contains gas exhibiting sharp molecular resonance close to one of the side-band frequencies of said mixer output, a demodulator upon which is impressed the microwave energy transmitted by said cell for derivation therefrom of a voltage whose phase angle varies with the frequency of said microwave oscillator, and a phase-comparator upon which is impressed said derived voltage of variable phase angle and a voltage of fixed phase angle from the modulating oscillator for production of a frequency-control voltage applied to said microwave oscillator.

14. A system for stabilizing the frequency of a microwave oscillator comprising a modulating oscillator, a modulator upon which the outputs of said oscillators are impressed, a cell upon which the output of said modulator is impressed and which contains gas exhibiting sharp molecular resonance close to one of the side-band frequencies of said modulator output, a demodulator upon which the microwave energy transmitted by said gas cell is impressed, mixers upon which are respectively impressed modulated output of said microwave oscillator and a selected component of the output of said demodulator, and a phase-comparator whose input circuits are respectively connected to said mixers to produce a frequency-control voltage applied to said oscillator and varying in accordance with the phase-shift of said one of said side-band frequencies in transmission through said cell.

15. A microwave device comprising a pair of "Magic Tees" each consisting of a closed-ended section of waveguide and waveguide legs extending therefrom, a waveguide section interconnecting two legs of the respective "Magic Tees" and containing gas exhibiting sharp molecular resonance at a microwave frequency, the other legs of the "Magic Tees" receiving microwave energy of said frequency, balanced modulator means coupled to the closed-end section of one of said "Magic Tees" for producing side-band frequencies impressed upon said gas, and demodulator means coupled to the closed-ended section of the other of said "Magic Tees" to demodulate side-band energy transmitted by said gas.

16. A microwave device comprising a pair of "Magic Tees" each consisting of a closed-ended section of waveguide and waveguide legs extending therefrom, a waveguide section interconnecting two legs of the respective "Magic Tees" and containing gas exhibiting sharp molecular resonance at a microwave frequency, the other legs of the "Magic Tees" receiving microwave energy of said frequency, balanced modulator means coupled to the closed-end section of one of said "Magic Tees" for producing side-band frequencies impressed upon said gas, and balanced demodulator means coupled to the closed-end section of the other of said "Tees" to demodulate side-band energy transmitted by said gas.

17. A microwave device for producing a low-frequency phase-shift varying in accordance with shift of a microwave frequency comprising a pair of "Magic Tees" each consisting of a pair of close-end sections of waveguide and two waveguide legs extending therefrom, one leg of each of said "Magic Tees" receiving energy of said microwave frequency, balanced modulated means coupled to the closed-end section of one of said "Magic Tees" for impressing a low-frequency on said microwave energy to produce a side-band, a waveguide section connecting the other legs of said "Magic Tees" and containing gas exhibiting sharp molecular resonance at a frequency close to the side-band frequency, and demodulator means coupled to the closed-ended section of the other of said "Magic Tees" to derive from microwave energy transmitted by said gas the low-modulating frequency at a phase-angle determined by the difference between resonant frequency of said gas and the side-band frequency.

LOWELL E. NORTON.

No references cited.